(No Model.)

A. WILBUR.
PIPE COUPLING.

No. 338,036.  Patented Mar. 30, 1886.

Attest:
Walter Donaldson
F. L. Middleton

Inventor
Alfred Wilbur
by Joyce & Kear
Att'ys

UNITED STATES PATENT OFFICE.

ALFRED WILBUR, OF ALLEGHENY CITY, PENNSYLVANIA.

PIPE-COUPLING.

SPECIFICATION forming part of Letters Patent No. 339,036, dated March 30, 1886.

Application filed August 22, 1885. Serial No. 175,098. (No model.)

*To all whom it may concern:*

Be it known that I, ALFRED WILBUR, of Allegheny City, in the county of Allegheny and State of Pennsylvania, have invented a new and useful Improvement in Pipe-Couplings; and I do hereby declare that the following is a full, clear, and exact description of the same.

My invention is an improved coupling for gas, steam, or water pipes, or any pipes requiring close-fitting joints.

The object of the invention is to provide a tight joint capable of resisting strain without becoming loose, and adapted to be readily applied or removed.

The invention consists, first, in combination, with threaded pipe ends, of a sleeve covering the same, recessed to form a chamber having ribs near its central part, said sleeve also having unthreaded ends fitting closely around the pipe and closing the opening to the interior of the sleeve, the space between the ends of the sleeve and the ribs containing a suitable filling.

The invention also consists in the method of applying the described sleeve, and in details of construction, all as hereinafter explained.

Figure 1:
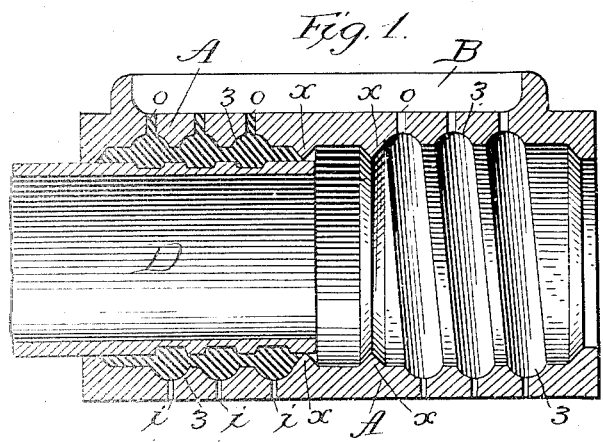
Figure 2:
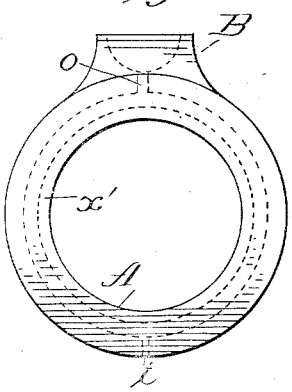
Figure 3:
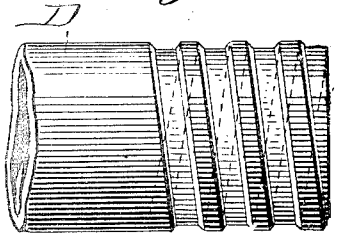

The construction is shown in the accompanying drawings, in which Figure 1 represents a central longitudinal section of the coupling-sleeve with the end of the pipe in place. Fig. 2 shows an end elevation, and Fig. 3 shows one end of the pipe removed from the sleeve.

The coupling-sleeve is shown at A, substantially tubular in form. Its interior surface is recessed at each end with recesses or chambers, which extend from a point near the ends of the sleeve and terminate at a suitable distance from the center thereof. The inner wall or termination of each chamber is formed by an annular rib on the inner face of the sleeve, preferably V-shaped in cross-section, as shown at $x$ in Fig. 1. The walls of the chamber, at the outer ends of the sleeve, are formed by smooth or unthreaded portions, to which the pipe is accurately fitted, the pipe also being accurately fitted to the rib $x$. The sleeve thus formed may be slipped upon the pipe and adjusted by slipping accurately in place upon the two ends of the pipe. These pipe ends need not be brought together, it being only necessary that they should enter the ribs $x$ $x$, and the space between the ends may be unoccupied except by the gas or water in the pipe. The recesses are provided with coarse interior threads, 3, (shown in the drawings as rounded,) with the ridges between cut down so as to form the chamber or recess.

Coarse exterior threads are formed on the ends of the pipes, preferably with inclined sides and flat bottom, as shown in the drawings. Coarse threads and threads thus formed are used for the purpose of allowing the lead to enter more freely and completely.

It will be observed from an inspection of the drawings that the threaded portion of the pipe end lies within the recess or chamber in the sleeve when the pipe is in place. Therefore when the lead is run into the chamber surrounding this threaded portion it fills the thread and the whole chamber, but is retained within the chamber by the close fit of the pipe upon the inner and outer walls of the chamber—that is to say, the rib $x$ and the part of the sleeve at the end bearing upon the pipe. This forms a tight packing by the contact of the lead with the threaded surface of the pipe. At the same time that this tight joint is formed by contact of lead with the metal of the pipe the pipe is supported in the sleeve by contact with the hard metal of the sleeve, this by reason of its bearings at the end of the sleeve and upon the rib $x$. The coupling has therefore the same strength and rigidity as if the pipe were secured into an ordinary threaded sleeve, and at the same time the tightness of the lead packing on the threaded surface is secured. At the same time no turning of the pipe or sleeve is required in coupling, and by reason of the threaded pipe end the connection may be broken by unscrewing in the same manner as in the ordinary pipe-coupling. The threads in the recessed surface of the sleeve itself serve as a lock-joint and to aid in forming a tight joint between lead and sleeve to hold the lead in the sleeve. On the outside of the sleeve an elongated cup, B, is formed, having holes $o$ leading into the annular chambers heretofore described, and to insure a perfect flow of lead, air-holes $i$ $i$ are formed from the threads to the outside on the opposite side of the sleeve. The lead or other easily-fusible metal is poured into the cup after the sleeve and pipes are properly placed.

There will be a small opening where the thread of the pipe crosses the rib $x$, which might admit a small portion of the lead into the cavity between the pipe ends; but this can be stopped by a bit of clay or any suitable material.

With the coarse threads and the construction in other respects as above described the lead under ordinary circumstances will form an impervious joint; but for greater security, and where extraordinary means are required to resist pressure upon the joint, I expand the sleeve by heat before slipping it upon the ends of the pipes, and after it has been thus expanded and while in place I pour in the lead in the manner described. The sleeve in cooling contracts and reduces the size of the chamber, thus compressing the lead and causing it more completely to fill all the spaces and to exclude air-holes, which might otherwise be formed.

It will be apparent that sections of pipe may be put together in the manner above described, and the sections thus joined may all be handled as if they were united by the ordinary threaded couplings, without danger of rupturing or displacing the lead, as would be the case if the bearing of the pipe were wholly upon the lead.

I am aware that pipe-couplings have been heretofore formed in which the coupling-sleeve and pipe were united by being screwed together, the thread of the pipe fitting the threads of the sleeve, (as in the patent of Young, September 15, 1885,) with a lead packing run into the chamber formed in the sleeve and about the pipe; and my invention is distinguished from this by the fact that the pipe is not threaded into the metal of the sleeve, but the sleeve is adapted to slip upon the pipe. I am also aware that very many forms of packing have been heretofore known in which lead is poured or packed around the pipe between it and the sleeve. My invention differs from these in this, that the pipe while being adapted to slip into the sleeve, or to allow the sleeve to be slipped back upon the pipe for convenience in putting down, and while the pipe has the threaded lead connection or packing, it still bears upon the metal of the sleeve, and thus is formed a rigid and strong connection, as heretofore explained; and my improved method is applicable only and is confined to the described chambered sleeve arranged in the manner described with the pipe; and the advantage resulting from the heating of the sleeve before applying it to the pipe is that by so heating the chamber is enlarged and when the sleeve cools after the lead is poured in the chamber is contracted, and thus the lead is compressed, forcing it into a better and more secure joint.

I claim as my invention—

1. In combination with threaded pipe end, a sleeve covering the same, recesses to form a chamber having ribs $x$ $x$, said sleeve also having unthreaded ends fitting closely around the pipe and closing the opening to the interior of the sleeve, the spaces between the ends of the sleeve and the ribs containing a suitable filling, substantially as described.

2. The method of combining the described chambered coupling-sleeve with the described threaded pipe end, the same consisting in first heating the sleeve and then, while it is still hot and expanded, slipping it into its proper place upon the threaded pipe end, then pouring in the melted lead and allowing it to cool, whereby the lead is compressed, all as set forth.

3. In combination with threaded pipe ends, a sleeve covering the same, having internal threads, 3, ribs $x$ $x$, unthreaded ends fitting closely around the pipe and closing the opening to the interior of the sleeve, the spaces between the ends of the sleeve and the ribs $x$ $x$ containing a suitable filling, substantially as described.

In testimony whereof I have signed my name to this specification in the presence of two subscribing witnesses.

ALFRED WILBUR.

Witnesses:
JAS. P. QUINN,
ANDREW FISHER.